United States Patent [19]

Weill

[11] Patent Number: 4,647,055
[45] Date of Patent: Mar. 3, 1987

[54] CARRIER TROLLEY, ESPECIALLY FOR CUSTOMERS OF SELF-SERVICE STORES

[75] Inventor: Guy Weill, Hoenheim, France

[73] Assignee: Ateliers Reunis, Schiltigheim, France

[21] Appl. No.: 738,385

[22] Filed: May 28, 1985

[30] Foreign Application Priority Data

Apr. 2, 1985 [FR] France ............................... 85 04966

[51] Int. Cl.⁴ ............................................ B62B 11/00
[52] U.S. Cl. ......................... 280/33.99 A; 280/33.99 S
[58] Field of Search ................. 280/33.99 R, 33.99 S, 280/33.99 A, 33.99 C, DIG. 4, 46, 33.99 F, 33.99 H; 186/63, 64, 65

[56] References Cited

U.S. PATENT DOCUMENTS

| | | | |
|---|---|---|---|
| 2,556,532 | 6/1951 | Goldman | 280/DIG. 4 |
| 3,015,494 | 1/1962 | Fosbrook | 280/46 |
| 3,044,577 | 7/1962 | Lotz | 280/33.99 C |
| 3,912,291 | 10/1975 | Frisch | 280/33.99 A |
| 4,519,622 | 5/1985 | Levy-Joseph | 280/33.99 S |

*Primary Examiner*—David M. Mitchell
*Attorney, Agent, or Firm*—Young & Thompson

[57] ABSTRACT

A trolley comprising a wire basket supported by a base frame for carrying merchandise in self-service stores and the like. The front end of the trolley is capable of engaging within the rear end beneath the carrier basket of a similar trolley located in front. At the time of interengagement of the two trolleys, an inclined ramp carried by a flat bar separately mounted on each side of the base frame comes into contact with a horizontal crossmember of the front trolley, the wheels of which are thus lifted off the ground. Each trolley-lifting ramp is preferably constituted by a metallic strip having a forwardly-sloping portion, a central ridge and a backwardly-sloping portion. After interengagement to two trolleys, the uplifted cross-member of the front trolley is located beyond the ridge, thus coupling the two trolleys together.

4 Claims, 9 Drawing Figures

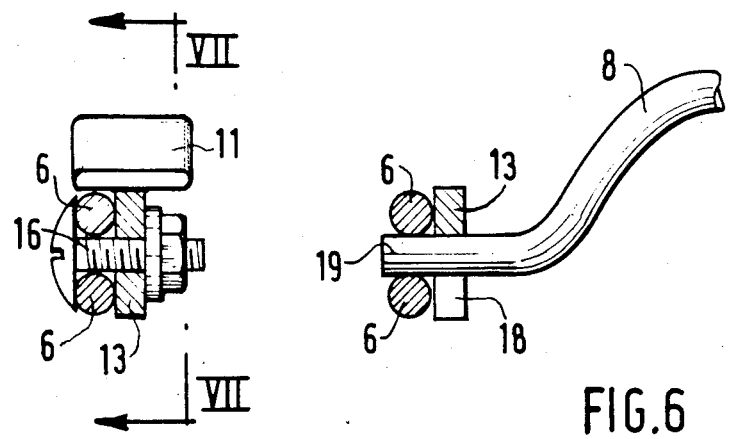
FIG. 5
FIG. 6
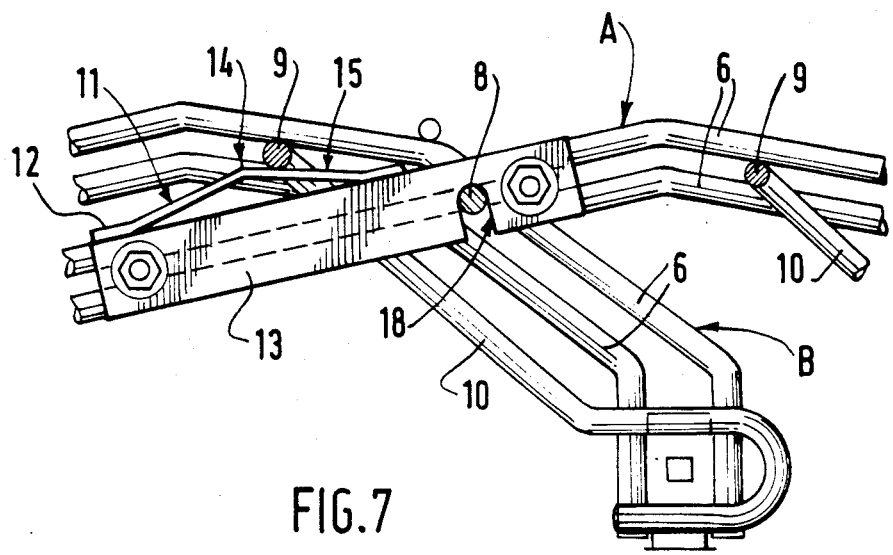
FIG. 7

CARRIER TROLLEY, ESPECIALLY FOR CUSTOMERS OF SELF-SERVICE STORES

BACKGROUND OF THE INVENTION

1. Field of the Invention

The present invention relates to carrier trolleys placed at the disposal of customers of self-service stores for transporting selected products and merchandise. Trolleys of this type consist of a large carrier basket located at a predetermined height with respect to a base frame on which the wheels are fixed, an operating handle-bar being provided at the top rear end of the trolley.

2. Description of the Prior Art

In order to reduce the bulk of trolleys when they are placed in readiness for use, they are usually designed so as to fit one inside the other. To this end, the rear vertical wall of the carrier basket is constituted by a flap which is hinged along its top edge and can thus be lifted in order to permit engagement of the front end of the carrier basket of another trolley. The base frame of a self-service trolley also has a shape which permits nesting of a number of trolleys by engagement of the front end of each trolley within the rear end of another trolley.

In order to facilitate the combined displacement of an entire row or "train" of interengaged trolleys, it has already been proposed to provide means for lifting the rear wheels of each trolley except for those of the trolley located at the rear end of the train.

Thus the base frame of the trolley described in French patent No. 2,537,076 comprises two side members, the inclined front portion of which is intended to engage beneath a horizontal cross-member forming part of the base frame of the trolley located in front at the time of engagement of the front end of one trolley in the rear end of another trolley placed in front, thus having the effect of lifting said rear end. However, this solution entails the need to ensure that the side members of the base frame are inclined at a strictly constant angle. If this condition is not satisfied, engagement of a rear trolley may fail to lift the rear wheels of the front trolley. However, since the side members of the base frame are formed by elbowed wires, it proves difficult in practice to ensure that the angle of slope of the baseframe side members at the rear end is continuously maintained at a constant and perfectly accurate value under actual service conditions.

SUMMARY OF THE INVENTION

For the reasons given in the foregoing, the present invention is directed to a trolley in which lifting of the rear wheels at the time of interengagement of a number of trolleys is produced by different means so designed as to prove fully satisfactory in service.

To this end, each side of the base frame of said trolley is provided with an added member which is adapted to carry an inclined ramp, said ramp being capable at the time of interengagement of two trolleys of coming into contact with a horizontal cross-member of the trolley located in front so as to cause an upward displacement of the rear end of the base frame of the front trolley and thus to lift its rear wheels off the ground.

In accordance with another distinctive feature, each added member which carries a trolley-lifting ramp consists of a flat bar placed in a vertical plane and fixed against the corresponding side of the base frame, said flat bar being provided with a notch in which the corresponding end of a wire member is engaged.

Thus the position of each trolley-lifting ramp is a direct function of the position of the corresponding base-frame cross-member which is fixed with precision at the time of manufacture of the trolley. However, as will be explained in detail in the following description, provision can also be made for adjusting or displacing the trolley-lifting ramps in the longitudinal direction.

BRIEF DESCRIPTION OF THE DRAWINGS

Other features of the invention will be more apparent to those skilled in the art upon consideration of the following description and accompanying drawings, wherein:

FIGS. 5 and 6 are fragmentary transverse sectional views corresponding to lines V—V and VI—VI of FIG. 2 but drawn to a scale which is different from that of FIG. 2;

FIG. 7 is a fragmentary vertical part-sectional view taken along line VII—VII of FIG. 5.

DETAILED DESCRIPTION OF THE INVENTION

Figure 1:
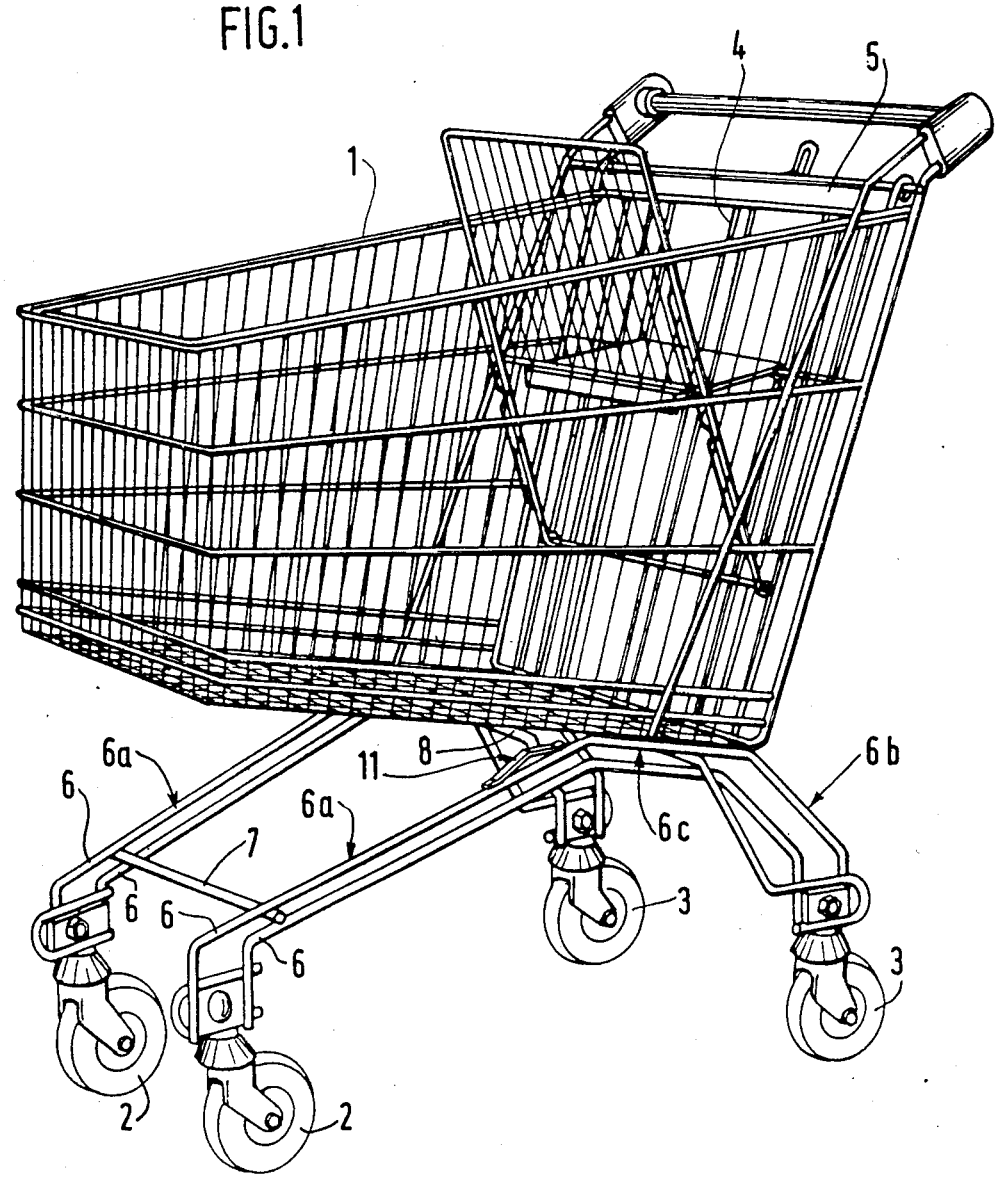
FIG. 1 is a view in perspective showing a trolley in accordance with the invention.

The trolley in accordance with the invention comprises in known manner a carrier basket 1, the bottom of which is located at an appreciable height above ground which may be within the range of 35 to 45 centimeters, for example. Said carrier basket is supported by a base frame mounted on four wheels, namely two swiveling wheels or casters 2 at the front end and two non-swivelling wheels 3 at the rear end. In order to permit engagement of another trolley, the rear wall is constituted by a flap 4 which is also made of wire and pivotally mounted on a hinge-pin 5 at the top end. In accordance with known arrangements, the flap 4 may be adapted to carry other articulated elements which can serve as baby seats as in the case of the example illustrated.

The base frame of said trolley is constituted by two side members each consisting of two parallel wires 6 disposed in the same vertical plane. Said side members each have a front portion 6a which is downwardly inclined and a rear portion 6b which is also inclined. These two portions are separated by a central portion 6c which serves as a support for the rear portion of the carrier basket 1.

At the front end, the two side members are joined together by means of a horizontal cross-member 7 of wire. Another similar cross-member 8 is placed near the point of junction between the front portion 6a of the side members and their central portion 6c. This second cross-member is elbowed in order to serve as a support beneath the carrier basket 1. Finally, provision is made for a third cross-member 9 which connects the central portion 6c of the two side members of the base frame. Said third cross-member is formed by a length of wire, the ends 10 of which are elbowed downwards and bent back to the rear in order to serve virtually as props. However, at the time of engagement of the front end of a trolley within the rear end of another identical trolley, the aforesaid rear cross-member 9 is also intended to cooperate with the lifting ramps provided on said other identical trolley.

Figure 4:
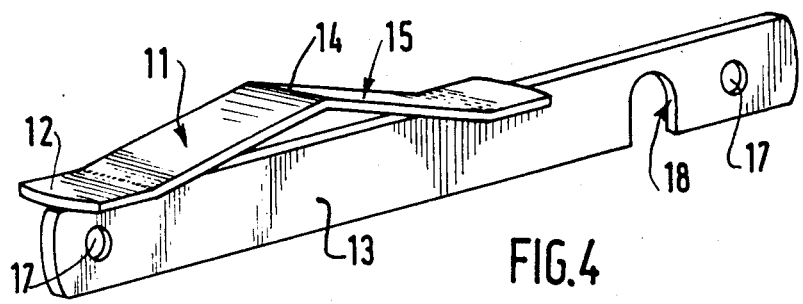
FIG. 4 is a view in perspective showing the trolley-lifting ramps and the member which serves as a ramp support.

Each of these ramps is constituted by the inclined front portion 11 of an elbowed metallic strip 12 fixed on the top edge face of a flat bar 13 which is placed in a vertical plane and serves as a support for said strip (as shown in FIG. 4). The metallic strip 12 has a top ridge 14 followed by an inclined rear portion 15. The flat bar 13 is fixed against the internal face of the corresponding side member by means of two bolts 16. Said bolts are engaged between the two wires which constitute said side member as well as through holes 17 formed in said bar.

The flat bar is provided at the rear end, however, with a notch 18 which is intended to serve as a housing for the corresponding end portion 19 of the intermediate cross-member 8 of the base frame, said end portion being also engaged between the two wires 6 which constitute the corresponding side member. Thus the position of each flat bar 13 and consequently the position of each trolley-lifting ramp 11 is directly determined by the position of the cross-member 8. In point of fact, said cross-member is accurately fixed on the base frame at the time of manufacture of the trolley.

Figure 2:
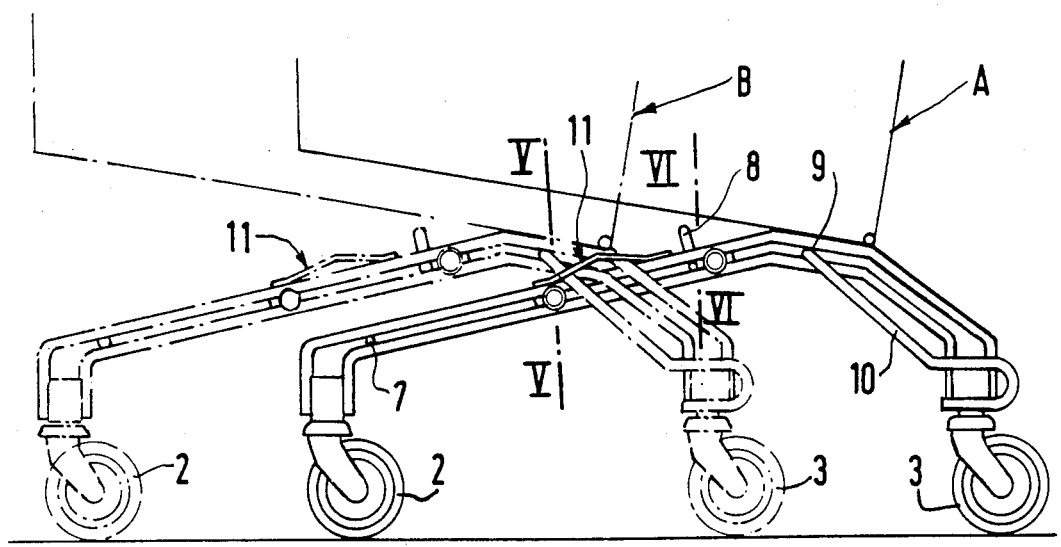
FIG. 2 is a partial view in side elevation showing two trolleys in accordance with the invention at the beginning of engagement of one trolley within another.
Figure 3:
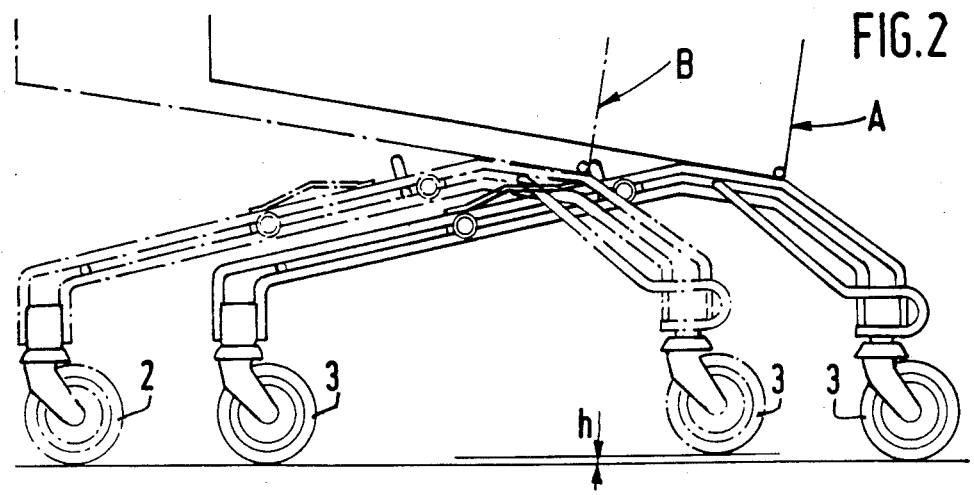
FIG. 3 is a similar view showing the same trolleys after completion of interengagement.

When a trolley A in accordance with the invention is engaged within the rear end of an identical trolley B located in front, the front end of its base frame engages beneath the carrier basket of said trolley as shown in FIG. 2. At a point near the end of this movement of engagement, the ramps 11 of the rear trolley A come into position beneath the rear cross-member 9 of the front trolley B, slide against said cross-member and thus lift the rear end of the trolley B. On completion of this movement of engagement, the ridge 14 of each trolley-lifting ramp comes into position at a point located beyond the cross-member 9 of the front trolley B. This results in virtual coupling of the two trolleys A and B whilst the rear cross-member 9 of the front trolley B rests against the rear portion 15 of the trolley-lifting ramps as shown in FIG. 7. In this position, the rear wheels 3 of the front trolley B are located at a distance h above the ground (as shown in FIG. 2).

Under these conditions, at the time of interengagement of a series of trolleys, the rear wheels of all these trolleys are lifted off the ground, with the exception of the rear wheels of the last trolley of the corresponding trolley train. This accordingly permits easy handling and displacement of the entire train.

A point worthy of note is that the ramps 11 permit lifting of the rear wheels in a wholly reliable manner as well as coupling of the trolleys which have been engaged one inside the other. Moreover, by virtue of their basic structural design, said ramps are extremely rugged and are not liable to undergo any deformation during use. It should be mentioned in addition, and above all, that the position of said ramps is extremely precise since it is directly determined by the position of the upper cross-member of the base frame of the corresponding trolley.

Figure 4A:
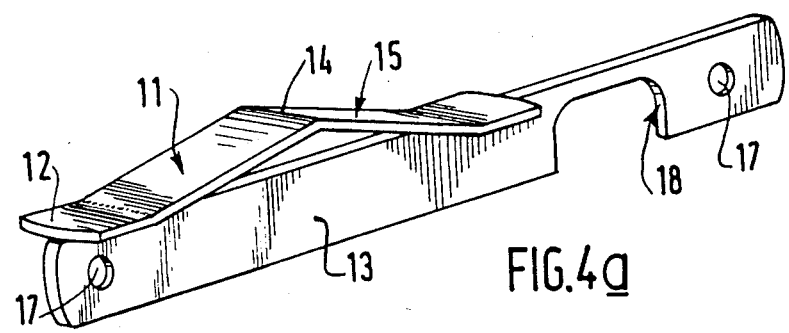
FIG. 4a is a view in perspective of an alternative embodiment of the ramp support member.

However, provision can also be made for an additional possibility of adjustment of the exact position of each trolley-lifting ramp 11. To this end, it is only necessary to increase the width of the notch 18 of the flat bars 13 which serve as supports for said ramps. (See FIG. 4a)

Thus, by slackening-off the fixing bolts 16, it is possible to displace the flat bars 13 and the ramps 11 in the longitudinal direction in order to fix them in a different position.

Figure 4B:
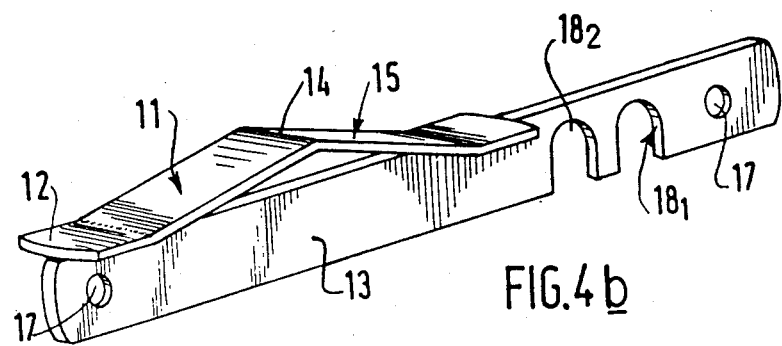
FIG. 4b is a view in perspective of a second alternative embodiment of the ramp support member.

An alternative expedient as shown in FIG. 4b would consist of a plurality of notches 18, located in spaced relation on each bar 13 in the longitudinal direction. Thus said flat bars could be fixed in a number of different positions by engaging any one notch 18 on the corresponding end portion of the horizontal cross-member 8 of the trolley base frame.

In the example described in the foregoing, the side members of the trolley base frame are formed by two parallel wires disposed in the same vertical plane. However, these side members could be arranged in a different manner and the structure of the base frame could in turn be modified, in which case the attachment of the trolley-lifting ramps 11 would be adapted to such a modification.

What is claimed is:

1. A carrier trolley, especially for customers of self-service stores, comprising a merchandise carrier basket supported by a base frame and located at a predetermined height with respect to the wheels, the front portion of the base frame being capable of engaging beneath the carrier basket of a similar trolley at the time of engagement of one trolley in the rear end of a front trolley, wherein each side of said base frame comprises an inclined frame member adapted to carry a support member bearing an inclined ramp, said ramp comprising oppositely inclined surfaces interconected by a ridge and thus being capable at the time of interengagement of two trolleys of coming into contact with a first horizontal cross member of the trolley located in front so as to cause an upward displacement and retention of the rear end of the base frame of the front trolley and thus to lift its rear wheels off the ground, said base frame further comprising a second horizontal frame member having ends, said support member comprising a flat bar located in a vertical plane and fixed against the corresponding inclined frame member, said flat bar having means for adjusting its position along said inclined frame member, said adjusting means comprising a notch in which is engaged the corresponding end portion of said second horizontal frame member which forms one of the horizontal cross-members of the base frame.

2. A carrier trolley according to claim 1, wherein each inclined frame member is formed by two parallel wires located in the same vertical plane and said adjusting means of said flat bar comprises means extending between the two wires of the inclined frame member for adjustably engaging said flat bar against said two wires.

3. A carrier trolley according to claim 1, wherein said notch is distinctly greater in width than the cross-section of the second horizontal frame member and thus makes it possible to adjust the postion of each trolley lifting ramp in the longitudinal direction.

4. A carrier trolley according to claim 1, wherein, in order to receive the corresponding end of said second horizontal frame member, the flat bar which serves as a support for each trolley lifting ramp is provided with a plurality of notches in spaced relation in the longitudinal direction and thus makes it possible to fix each trolley lifting ramp in different positions in the longitudinal direction.

* * * * *